United States Patent
Qu et al.

(10) Patent No.: US 11,909,630 B1
(45) Date of Patent: Feb. 20, 2024

(54) HITLESS MIGRATION OF INTERCONNECTED DATA CENTER NETWORKS FOR NETWORK VIRTUALIZATION OVERLAY USING GATEWAYS

(71) Applicant: Arista Networks, Inc., Santa Clara, CA (US)

(72) Inventors: Hui Qu, Austin, TX (US); Xuan Qi, Austin, TX (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 19 days.

(21) Appl. No.: 17/877,808

(22) Filed: Jul. 29, 2022

(51) Int. Cl.
*H04L 45/24* (2022.01)
*H04L 12/46* (2006.01)
*H04L 45/741* (2022.01)
*H04L 45/745* (2022.01)

(52) U.S. Cl.
CPC .......... *H04L 45/24* (2013.01); *H04L 12/4633* (2013.01); *H04L 45/741* (2013.01); *H04L 45/745* (2013.01)

(58) Field of Classification Search
CPC ... H04L 45/24; H04L 12/4633; H04L 45/741; H04L 45/745
See application file for complete search history.

(56) References Cited

U.S. PATENT DOCUMENTS

| | | | |
|---|---|---|---|
| 8,798,060 B1* | 8/2014 | Vautrin | H04L 12/4633 370/466 |
| 11,296,907 B2 | 4/2022 | Qu | |
| 2017/0019331 A1* | 1/2017 | Yong | H04L 45/22 |
| 2018/0013584 A1* | 1/2018 | Shen | H04L 45/00 |
| 2018/0198754 A1* | 7/2018 | Kielhofner | H04L 45/50 |
| 2018/0287929 A1* | 10/2018 | Means | H04L 12/4633 |
| 2020/0021613 A1* | 1/2020 | Tong | H04L 45/72 |
| 2022/0244980 A1* | 8/2022 | Anderson | G06F 9/4856 |

\* cited by examiner

*Primary Examiner* — Oleg Survillo
*Assistant Examiner* — Monishwar Mohan
(74) *Attorney, Agent, or Firm* — Fountainhead Law Group P.C.

(57) ABSTRACT

Hitless migration of network devices for communication between two data centers using a dual IP stack mode is provided herein. In a first data center, a first gateway receives first routing information from an edge device regarding a first set of routes associated with a first host device in the first data center. The first gateway device generates a second set of routes that include a first address of the edge device formatted according to a first communication protocol. The second set of routes is exported to a second gateway device in a second data center. The first gateway device receives an encapsulated data packet having a first overlay that includes the first address from the second gateway device. The first gateway device decapsulates and re-encapsulates the data packet and a re-encapsulated data packet is sent to the edge device, the re-encapsulated data packet having a second overlay that includes the second address. The first address is formatted according to a first communication protocol and the second address is formatted according to a second communication protocol.

20 Claims, 10 Drawing Sheets

HITLESS MIGRATION OF INTERCONNECTED DATA CENTER NETWORKS FOR NETWORK VIRTUALIZATION OVERLAY USING GATEWAYS

BACKGROUND

The present application relates to network virtualization and, more particularly, to transitioning of transport networks between communication protocols.

Network virtualization has become a focal part of network design and involves the ability to decouple the physical topology from a virtual topology using tunneling, for example. The physical topology of the underlay of a network operates to transport data packets between nodes. The virtual topology or overlay of a network, by contrast, is built on top of the underlay network and corresponds to a virtual transport network of nodes and logical links where multiple layers of network abstraction can be created. The transport network may control a sequence of overlay nodes a data packet traverses before reaching its destination. By decoupling the underlay network from applications, network-wide virtualization can optimize computing and storage resources. Network virtualization has become a central, and even essential, part of organizations' network design.

Some communication protocols may be implemented to assist in network virtualization and convey data packets between source and destination nodes of a virtualized network, and between two different data centers. A collection of interconnected network devices may be transitioned to utilize a different communication protocol or a different version of a communication protocol. However, some network devices of the collection may be transitioned at a different time than other network devices of the collection. Transitioning different sets of network devices at different times without disrupting or losing overlay network traffic is a difficult challenge.

BRIEF DESCRIPTION OF THE DRAWINGS

With respect to the discussion to follow and in particular to the drawings, it is stressed that the particulars shown represent examples for purposes of illustrative discussion and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

Overview

Figure 1:
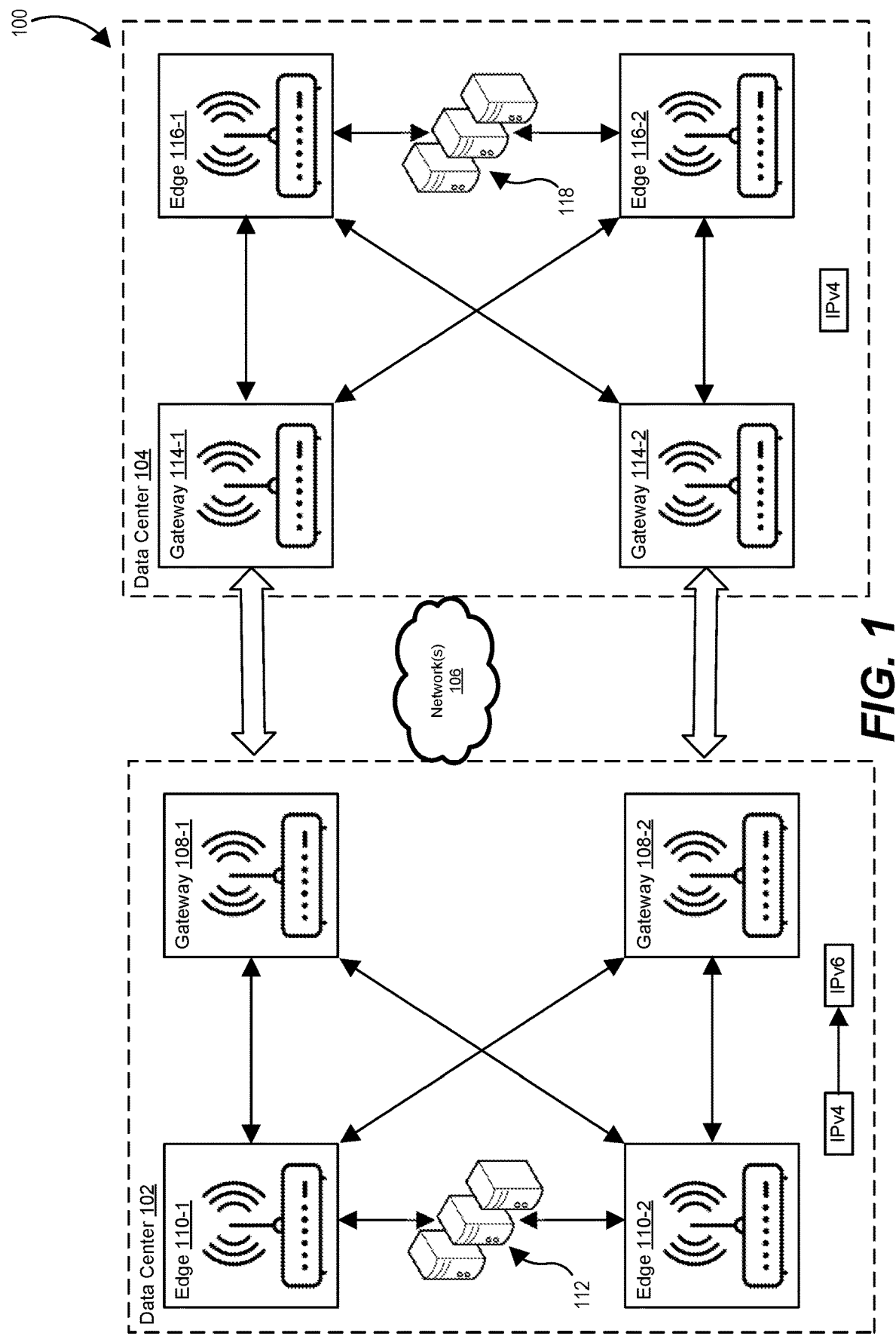
FIG. 1 illustrates an example network environment in which network devices mediate communications between host devices according to one or more embodiments.

The present disclosure provides techniques for migration of a set of network devices of an interconnected network without loss of network traffic. In the following description, for purposes of explanation, numerous examples and specific details are set forth to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

Tunneling methods aid in network virtualization and provide a simple interface for the transport networks. Tunnels can be established between nodes (e.g., routers) of an underlay network, facilitating movement of data across a network or from one network to another in an overlay network. For example, one or more tunnels can be used to create a Virtual Private Network (VPN) over public data networks. To establish a tunnel between two virtual nodes, identifiers of the nodes are known. A non-limiting example of such identifiers are internet protocol (IP) addresses, which are numerical labels assigned to each network device connected to a network that uses IP to communicate. Two versions of IP addresses include IP version 4 (IPv4) and IP version 6 (IPv6). IPv4 defines an IP address as a 32-bit number which provides for over four billion unique addresses. However, as the internet continues to grow, the depletion of available IPv4 address resulted in the development of IPv6 addresses. IPv6 defines an IP address as 128 bits (providing approximately $3.403 \times 10^{38}$ unique addresses) allowing for vastly more addresses. Many networks use only a single version of an address family (i.e., IPv4 or IPv6).

Due to specific network requirements or technological advancements, it is sometimes necessary for networks to transition from using one address family to another address family. Additionally, it may be necessary for a network or data center operating in one network protocol, such as IPv4, to be able to communicate with a network or data center operating in a different network protocol, such as IPv6. For example, it may be necessary for a network having a tunnel using IPv4 family addresses to transition to a tunnel using IPv6 family addresses. In the past, this transition started with shutting down the original tunnel that uses the IPv4 addresses and then proceeded to create a new tunnel using the IPv6 family addresses. To create a new tunnel using the IPv6 addresses, the switching devices transitioned from using the old address family to using the new address family. As the new tunnel was created and the switching devices were transitioned, data traffic was unable to flow, resulting in prolonged outages and loss of data traffic.

The present disclosure is directed to migration of an underlay network of an interconnected data center from a first communication protocol to a second communication protocol. The data center includes at least one gateway device, at least one provider edge device, and at least one host device. The data center may be connected over one or more networks with one or more other data centers that operate using the first and/or second network communication protocols. In existing implementations, migrating a data center involves isolating segments of an internal network of the data center, disabling devices in the segments, and upgrading the devices to perform a communication protocol involving the second communication protocols.

The present application provides techniques for migrating a data center from a first communication protocol to a second communication protocol without disrupting the exchange of overlay network traffic with other data centers and among the network devices of the data center itself. In an embodiment, a first gateway device of the data center establishes a network connection with a second gateway device of another data center using a first communication protocol. The first gateway device is transitioned to operate in a dual IP stack mode in which the first gateway device is configured to successfully process network traffic formatted according to both the first network communication protocol and second network communication protocols.

The provider edge device is also transitioned (e.g., by a network administrator) to the dual IP stack mode. A network tunnel is established within the data center between the provider edge device and the first gateway device using a communication protocol corresponding to the second communication protocol, such as IPv6. In the dual IP stack mode, the first gateway device advertises, to the set of provider edge devices of the interconnected data center, a first next hop address according to the second communication protocols.

The first gateway device is configured to install a route using an identifier of the provider edge device corresponding to the second communication protocol as a next hop. The first gateway device advertises the route to a second gateway device of another data center. The first gateway device receives a data packet from the second gateway device of an interconnected data center through the network tunnel using a first communication protocol. The first gateway device decapsulates the data packet, determines a first provider edge device that is a next hop for the data packet, and re-encapsulates the data packet according to the second communication protocol using a first identifier of the first provider edge device, the first identifier having a format according to the second communication protocol.

The first gateway device sends the re-encapsulated data packet to the first provider edge device. The first gateway device receives a data packet from the first provider edge device through a first tunnel using the second communication protocol, decapsulates the data packet, re-encapsulates the data packet using the second identifier of the second gateway device of another data center according to the first communication protocol, and sends the data packet to the second gateway device through a second tunnel using the first communication protocol. As a result, the first data center is migrated to communicate within itself using the second network communication protocol while maintaining its external communication with the second gateway device of another data center using the first network communication protocol without disruption or loss of network traffic of an overlay layer in the interconnected data center.

In some embodiments, the first gateway device and the second gateway device are both transitioned to the dual IP stack mode. The first gateway device and the second gateway device are both transitioned to operate in a dual IP stack mode in which the first gateway device and the second gateway device are both configured to successfully process network traffic formatted according to both the first network communication protocol and second network communication protocols. In this embodiment, the first gateway device of the first data center establishes a network connection, such as a network tunnel, with the second gateway device of another data center using a second communication protocol, such as IPv6. An internal network tunnel is also established between the provider edge device and the first gateway device using the first communication protocol, such as IPv4. The first gateway device receives a data packet from the first provider edge device through a first tunnel using the first communication protocol, decapsulates the data packet, re-encapsulates the data packet using the second identifier of the second gateway device of another data center according to the second communication protocol, and sends the re-encapsulated data packet to the second gateway device.

The second gateway device receives the re-encapsulated data packet from the first gateway device of the first data center through a tunnel using the second network communication protocol. The second gateway device decapsulates the data packet, refers to a routing table of the second gateway device, and determines the next hop to the identifier of a second provider edge device corresponding to the first communication protocol. The second gateway device re-encapsulates the data packet and sends it to the second provider edge device using an internal tunnel with the first communication protocol. As a result, the data centers are migrated to communicate with other data centers using the second network communication protocol but can still communicate internally using the first network communication protocol without disruption or loss of network traffic of an overlay layer in the data center.

System Architecture

FIG. 1 illustrates an example network environment 100 in which network devices mediate communications between host devices according to one or more embodiments. The network environment 100 includes a first data center 102 and a second data center 104 communicatively coupled to each other via one or more networks 106. The first data center 102 includes gateway devices 108-1 and 108-2 (collectively "gateway devices 108") communicatively coupled with a set of provider edge devices 110-1 and 110-2 (collectively "edge devices 110"). The edge devices 110 are communicatively coupled with and configured to convey data and/or communications with a set of computing resources. The computing resources are computing devices (e.g., servers, host devices), such as host devices 112, comprising one or more processors and at least one memory storing executable instructions that, as a result of execution by the one or more processors, cause the computing device to provision one or more applications or services (e.g., virtual machines, data storage, database applications, applications for streaming and processing audiovisual media, applications for managing internet-of-things data and devices; applications for mobile and web software). The host devices 112 have access to data storage volumes for storing, retrieving, and accessing data involved in the application(s) and/or service(s). Such data storage volumes may be locally or remotely located to the computing resources.

Second data center 104 includes gateway devices 114-1 and 114-2 (collectively "gateway devices 114") communicatively coupled with a set of provider edge devices 116-1 and 116-2 (collectively "edge devices 116"). The edge devices 116 are communicatively coupled with and configured to convey data and/or communications with a set of computing resources, such as host devices 118.

In the network environment 100, second data center 104 is operating according to a first communication protocol. The first data center 102 is migrating from operation according to a first communication protocol to operation according to a second communication protocol. In some embodiments, the first communication protocol may be a first version of a communication protocol and the second communication protocol is a second version of the communication protocol. For instance, devices in the first data center 102 are migrating from IPv4 to IPv6 whereas second data center 104 is maintaining operation using IPv4. Due to the number and variety of devices in the first data center 102, the devices are not migrated all at once. A pragmatic approach to migration is to transition some devices of the first data center 102 to IPv6 while the remaining devices continue operation using IPv4. During the migration, the network virtualization overlay maintains network traffic on top of the underlay networks of both IPv4 and IPv6 networks in first data center 102. Using previous solutions, it is a complex and difficult challenge to migrate the devices without disruption or loss of network traffic on the overlay network. The present disclosure provides techniques for hitless migration of devices between communication protocols or versions of a protocol without loss of overlay network traffic.

In the present disclosure, gateway devices are network devices that operate as a gateway with remote networks and that convert data packets received from another network from a first format or transmission protocol to a second format or transmission protocol. The gateway devices 108 enable devices in first data center 102 to interface or communicate with devices in second data center 104, and vice versa. Non-limiting examples of gateway devices include border routers, area boundary routers, and autonomous system border routers. Edge devices are network devices that operate to provide entry or exit points to or from a core network. Non-limiting examples of edge devices include routers, network switches, routing switches, and access devices.

The term "data center," as used herein, refers to a collection of network devices and computing resources contained within a set of buildings, the collection operating to provision data, applications, computing resources (e.g., virtual machines), or other assets of an entity. By way of non-limiting example, a data center may include routers, switches, access points, or other network devices and may include servers and/or data storage devices that are communicatively coupled with one or more of the network devices. In some embodiments, a data center includes a plurality of buildings distributed over a single campus, each building including a set of network devices connected with another set of network devices in another building of the data center. In some embodiments, a data center includes a plurality of buildings distributed over a geographical region (e.g., a state, a country) and communicatively coupled with one another via secure or private network connections.

There are two gateway devices 108 and two gateway devices 114 respectively shown in first data center 102 and second data center 104; however, it is understood that there may be more or fewer gateway devices in each data center without departing from the scope of the present disclosure. There are also two edge devices 110 and two edge devices 116 respectively shown in first data center 102 and second data center 104; however, it is understood that there may be more or fewer edge devices in each data center without departing from the scope of the present disclosure.

Those skilled in the art will appreciate that the present disclosure applies broadly to migration of data centers between communication protocols or protocol versions other than IPv4 and/or IPv6. Hitless migration of data center devices may apply, by way of non-limiting example, to the Virtual Extensible Local Area Network protocol (VXLAN), Internet Control Message Protocol (ICMP), Resource Reservation Protocol (RSVP), Generic Routing Encapsulation (GRE), Intermediate System to Intermediate System (IS-IS), and Open Shortest Path First (OSPF). Those skilled in the art will also appreciate that first data center 102 and/or second data center 104 may include a number of other network devices operating in various capacities.

Figure 2:
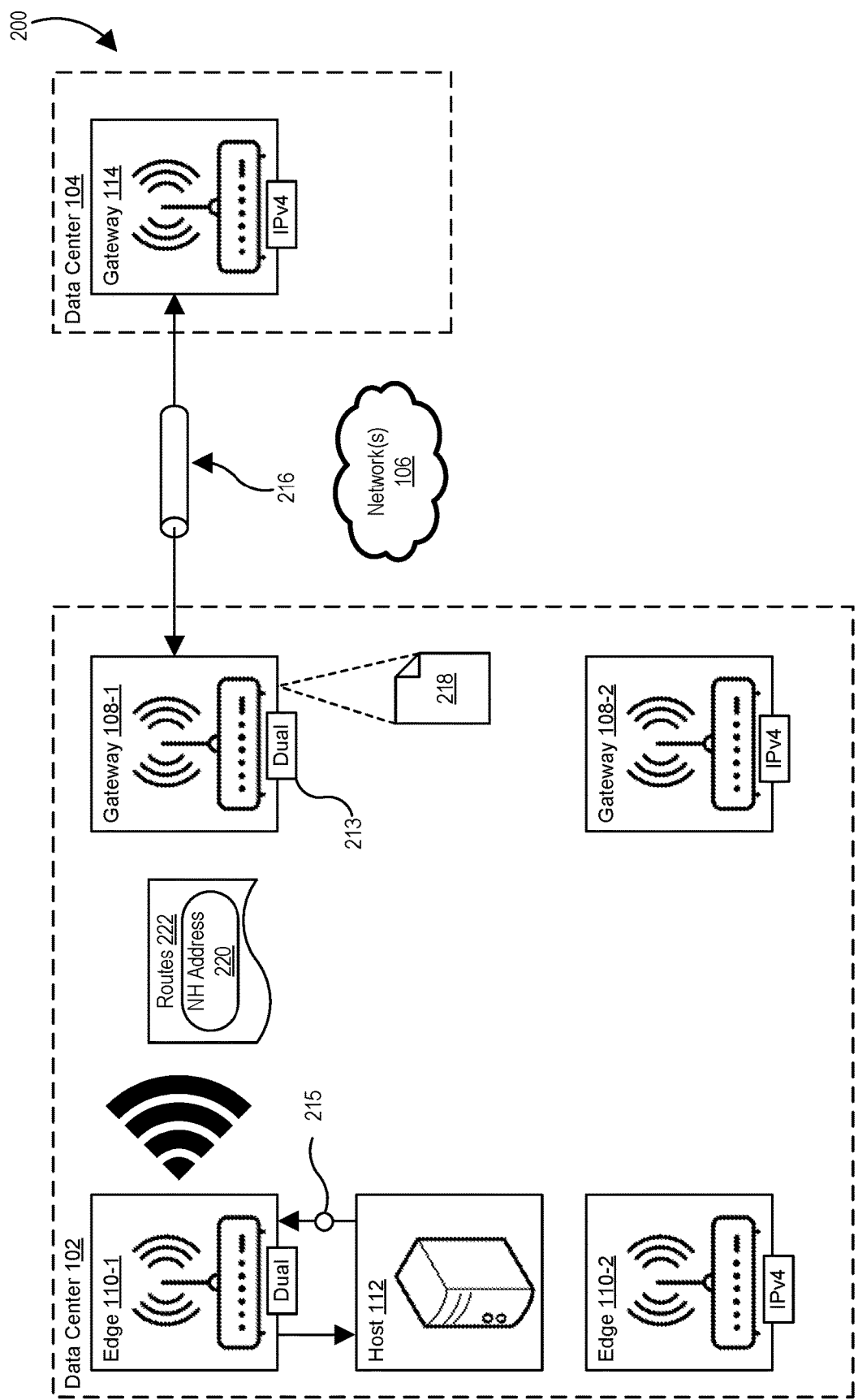
FIG. 2 illustrates an example network environment in which one or more network devices in a data center are in a migration process at a first time according to one or more embodiments.

FIG. 2 illustrates an example network environment 200 in which one or more network devices in a data center are in a migration process according to one or more embodiments. The network environment 200 is, more particularly, operating during a first time period to transition to a different communication protocol. During the first time period, edge device 110-1 broadcasts a set of routes including a next-hop address 220 of the edge device 110-1 to gateway 108-1 formatted according to the second communication protocol, and the routes are saved in routing table 218 of gateway 108-1, as will be described further below. Routes as described herein are exchanged in the control plane.

Various features in the network environment 200 correspond to devices described with respect to FIG. 1, so further description thereof is omitted for brevity. The network environment 200 includes first data center 102 and second data center 104 communicatively coupled with each other over one or more networks 106. The one or more networks 106 include at least one wide area network (WAN) over which one or more connections between first data center 102 and second data center 104 may be established.

The first data center 102 includes gateway devices 108-1 and 108-2, provider edge devices 110-1 and 110-2, and a host device 112. Second data center 104 includes gateway device 114 communicatively coupled with the gateway device 108-1. More particularly, the gateway device 108-1 and the gateway device 114 establish a network tunnel 216 over the one or more networks 106. In some embodiments, the network tunnel 216 is a VXLAN tunnel established over the WAN of the one or more networks 106. In some embodiments, the network tunnel 216 is established via a Border Gateway Protocol (BGP) Ethernet Virtual Private Network (EVPN).

In the network environment 200, first data center 102 is being migrated from a first communication protocol to a second communication protocol at a first time. The first communication protocol, in this non-limiting example, is IPv4 and the second communication protocol is IPv6. Second data center 104 includes network devices operating according to the first communication protocol; however, second data center 104 may include network devices operating according to the second communication protocol or according to both the first and second communication protocols in some embodiments. In some embodiments, the gateway device 108-1 may determine that the gateway device 114 is operating in a second mode in which the gateway device 114 is configured to process network traffic according to the first communication protocol and is not configured to process network traffic according to the second communication protocol. The gateway device 108-1 may determine that the gateway device 114 is operating in the second mode based on an IP address of the gateway device 114 received according to BGP.

As part of the migration described herein, the edge device 110-1 and the gateway device 108-1 are transitioned to operate in a dual IP stack mode 213 in which the devices can process and transmit data packets formatted according to IPv4 and data packets formatted according to IPv6. The edge device 110-2 and the gateway device 108-2 are configured to operate in the first communication protocol, which is IPv4 in this particular non-limiting example.

The edge device 110-1 communicates with the host device 112 and obtains routing information 215 regarding routes stored in memory of the host device 112. The routing information 215 obtained may include information regarding active routes stored in a routing table of the host device 112. Non-limiting examples of such routing information 215 includes destination addresses of data packets sent by the host device 112, mask information regarding network masks or submasks associated with the destination address, gateway information regarding gateway devices associated with the destination address, interface information regarding an interface or port associated with the destination address, and/or metrics (e.g., quality of service) regarding data packets sent to the destination address. The edge device 110-1 may store the routing information 215 obtained from the host device 112 in a routing table or other data structure used by the edge device 110-1 to route or forward data packets to and/or from the host device 112.

The edge device 110-1 broadcasts a set of routes 222 obtained from the host device 112 to one or more of the gateway devices 108 of first data center 102. The set of routes 222 may include at least some of the routing information 215 and provide reachability information for hosts external to first data center 102 to transmit data packets to the host device 112. The gateway device 108-1 receives the set of routes 222 and installs the set of routes 222 in a routing table 218 stored in local memory of the gateway device 108-1. The set of routes 222 installed in the routing table 218 include a next-hop address 220 of the edge device 110-1. The next-hop address 220 is formatted according to the second communication protocol in some embodiments—for instance, formatted according to IPv6 in this example.

Figure 3:
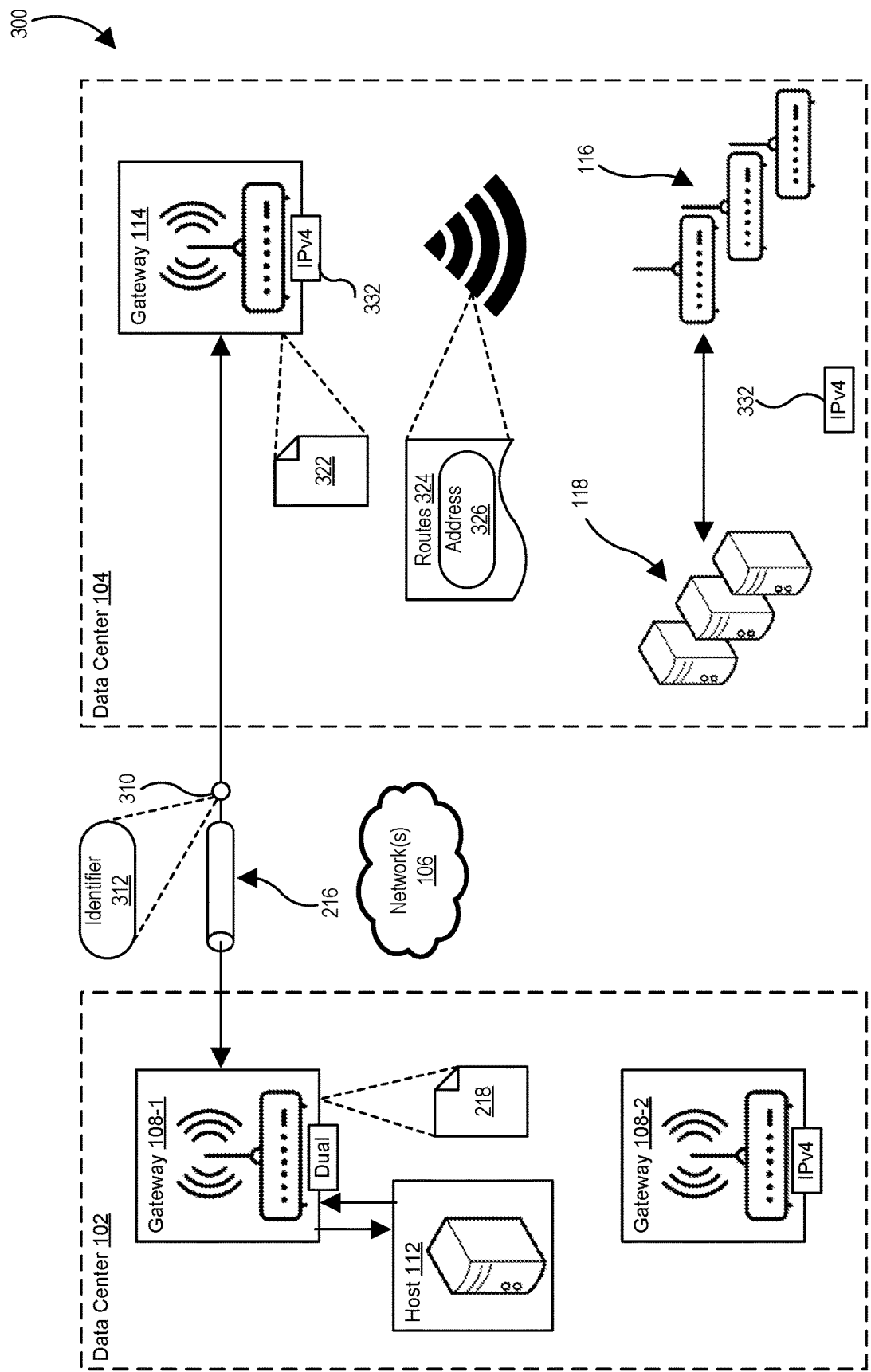
FIG. 3 illustrates an example network environment in which one or more network devices in a data center are in a migration process at a second time according to one or more embodiments.

FIG. 3 illustrates an example network environment 300 in which one or more network devices in a data center are in a migration process according to one or more embodiments. The network environment 300 is, more particularly, operating during a second time period after the first time period described with respect to FIG. 2. During the second time period, gateway device 108-1 generates a first set of modified routes 310 according to the first communication protocol and exports them to gateway device 114 in second data center. Additionally, gateway device 114 generates a second set of modified routes 324 according to the first communication protocol and broadcasts the second set of modified routes 324 to a set of edge devices 116, as will be further described below.

Various features in the network environment 300 correspond to devices described with respect to FIGS. 1, 2 and elsewhere herein, so further description thereof is omitted for brevity. The network environment 300 includes first data center 102 and second data center 104 communicatively coupled with each other over one or more networks 106. First data center 102 includes gateway device 108-1, gateway device 108-2 (configured to operate in the first communication protocol), and host device 112.

Gateway device 108-1 of first data center 102 generates a first set of modified routes 310 based on the set of routes 222 installed (see FIG. 2). The first set of modified routes 310 are generated, at least in part, by replacing the next-hop address 220 of the edge device 110-1 described with respect to FIG. 2 with an identifier 312 of the gateway device 108-1. In some embodiments, the identifier 312 is an address of the gateway device 108-1 formatted according to the first communication protocol. In this specific non-limiting example, the identifier 312 is an IPv4 address of the gateway device 108-1. In some embodiments, the identifier 312 may be an MPLS label generated according to a Border Gateway Protocol. In some embodiments, gateway device 108-1 may generate the first set of modified routes 310 as a result of a determination that another data center with which first data center 102 has established network connections is operating according to a first communication protocol 332.

The gateway device 108-1 exports a first set of modified routes 310 stored in routing table 218 to gateway device 114 of second data center 104 via the one or more networks 106. In some embodiments, the gateway device 108-1 may export the first set of modified routes 310 via network tunnel 216. The gateway device 114 receives the first set of modified routes 310 via the one or more networks 106. The gateway device 114 installs the first set of modified routes 310 in a routing table 322 stored in local memory of the gateway device 114.

The gateway device 114 generates a second set of modified routes 324 based on the first set of modified routes 310 received and stored. The second set of modified routes 324 are generated, at least in part, by replacing the identifier 312 of the gateway device 108-1 with an address 326 of the gateway device 114. The address 326 is formatted according to the first communication protocol, such as IPv4. The gateway device 114 broadcasts the second set of modified routes 324 to a set of edge devices 116. The address 326 in the second set of modified routes 324 may be associated with an address of the host device 112. For instance, a next-hop address advertised in the second set of modified routes 324 may be included in the same row or set of associated entries with an IP address of the host device 112.

The set of edge devices 116 install the second set of modified routes 324 in local memory—for example, in a set of routing tables respectively stored in memory of the set of edge devices 116. The set of edge devices 116 are communicatively coupled with a set of host devices 118 in second data center 104. The set of edge devices 116 may advertise one or more of the second set of modified routes 324 to the set of host devices 118. The set of edge devices 116 and the set of host devices 118 are operating according to the first communication protocol 332.

Figure 4:
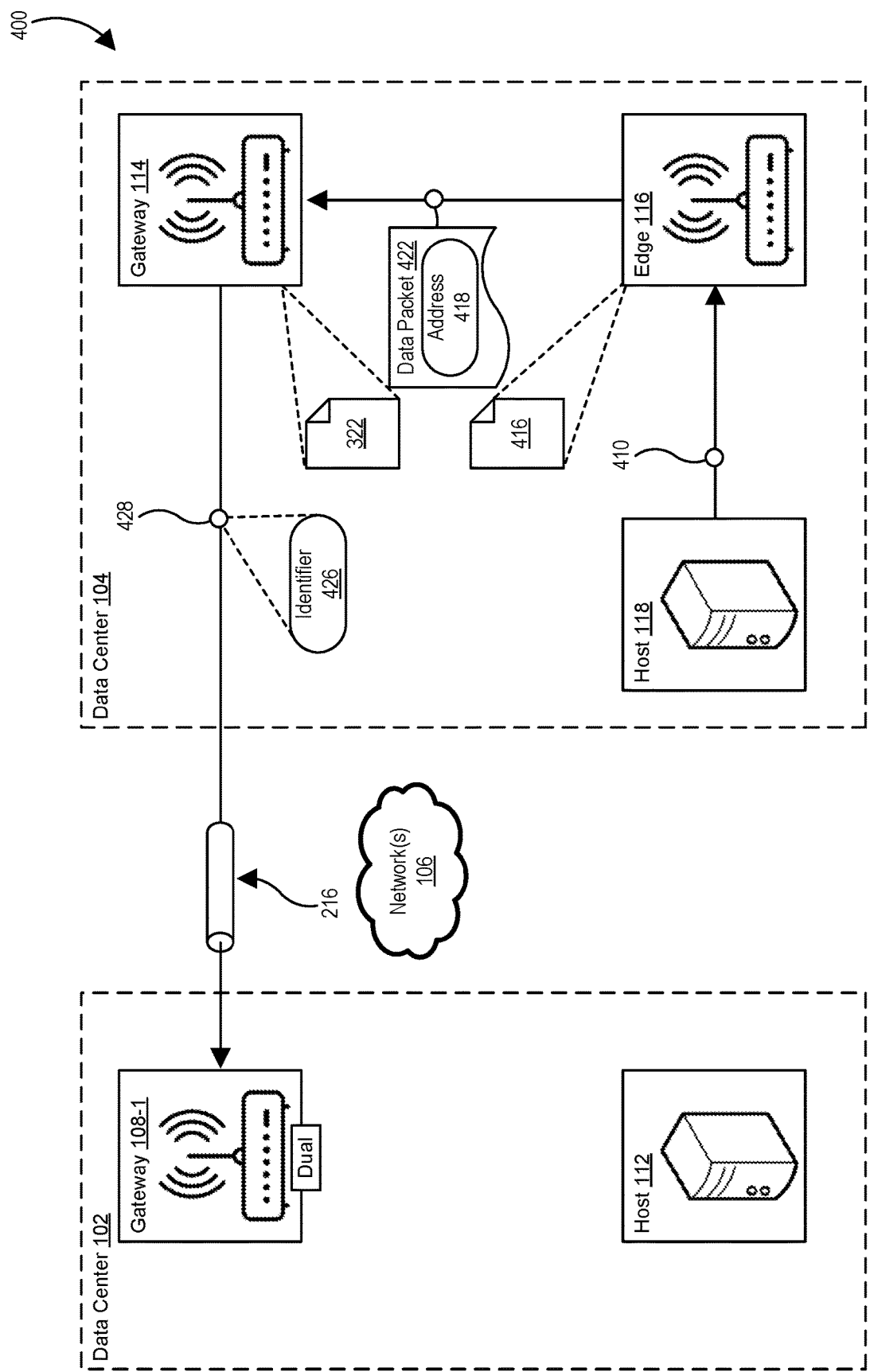
FIG. 4 illustrates an example network environment in which one or more network devices in a data center are in a migration process at a third time according to one or more embodiments.

FIG. 4 illustrates an example network environment 400 in which one or more network devices in a data center are in a migration process according to one or more embodiments. The network environment 400 is, more particularly, operating during a third time period after the second time period described with respect to FIG. 3. During the third time period, host device 118 sends data packet 410 to edge device 116, edge device 116 encapsulates the data packet according to a first communication protocol and sends the data packet to gateway 114, and gateway 114 decapsulates and re-encapsulates the data packet according to the first communication protocol to send to gateway 108-1, as will be further described below. Data is exchanged in the data plane as described herein.

Various features in the network environment 400 correspond to devices described with respect to FIGS. 1, 2, 3, and elsewhere herein, so further description thereof is omitted for brevity. The network environment 400 includes first data center 102 and second data center 104 communicatively coupled with each other over one or more networks 106.

A host device 118 in second data center 104 sends a data packet 410 to an edge device 116 in second data center 104. The data packet 410 is addressed to a host device 112 in first data center 102. For instance, the data packet 410 may have a header that includes a destination address corresponding to an IP address of the host device 112. The destination address may be formatted according to the first communication protocol or the second communication protocol. The host device 112 in first data center 102 and the host device 118 in second data center 104 are in the same overlay network. For instance, the host device 118 and the host device 112 may use or establish (e.g., via gateway devices) network tunnel 216 between first data center 102 and second data center 104. In some embodiments, the network tunnel 216 is a VPN or an EVPN tunnel established and operated according to a Border Gateway Protocol.

The edge device 116 receives the data packet 410 and accesses a routing table 416 stored in the memory of edge device 116 to determine how to encapsulate and route the data packet 410. More particularly, the edge device 116 identifies an entry in the routing table 416 that includes the destination address in the data packet 410 and determines a set of operations to perform and an overlay for the data packet 410. For example, an entry in the routing table 416 containing the destination address may indicate that a PUSH operation is to be performed and may include an address 418 provided by a gateway device 114 in second data center 104. The address 418 is formatted according to the first communication protocol described herein, such as IPv4. The edge device 116 generates an encapsulated data packet 422 having an overlay corresponding to the address 418. The edge device 116 sends the encapsulated data packet 422 to the gateway device 114.

The gateway device 114 receives the encapsulated data packet 422 and detects that the overlay of the data packet 422 matches an address of the gateway device 114. The gateway device 114 performs a predetermined operation on the encapsulated data packet 422. More specifically, the gateway device 114 removes the address 418 and examines the destination address of the data packet 422. The gateway device 114 accesses a routing table 322 stored in its memory to determine how to encapsulate and route the data packet 422. The gateway device 114 identifies an entry in the routing table 322 that includes the destination address in the data packet (e.g., the destination address of the host device 112). The gateway device 114 determines an identifier 426 to include in an overlay of the data packet based on a match between the destination address and an address in the routing table 322.

The gateway device 114 generates an encapsulated data packet 428 by at least including the identifier 426 as an overlay or service layer of the data packet 410. The identifier 426 is, in some embodiments, an IPv4 address of a gateway device 108 in first data center 102. In some embodiments, the identifier 426 is an MPLS label provided by the gateway device 108-1. The gateway device 114 sends the encapsulated data packet 428 to the gateway device 108-1 over the one or more networks 106. In some embodiments, the gateway device 114 sends the data packet 428 to the gateway device 108-1 via the network tunnel 216.

Figure 5:
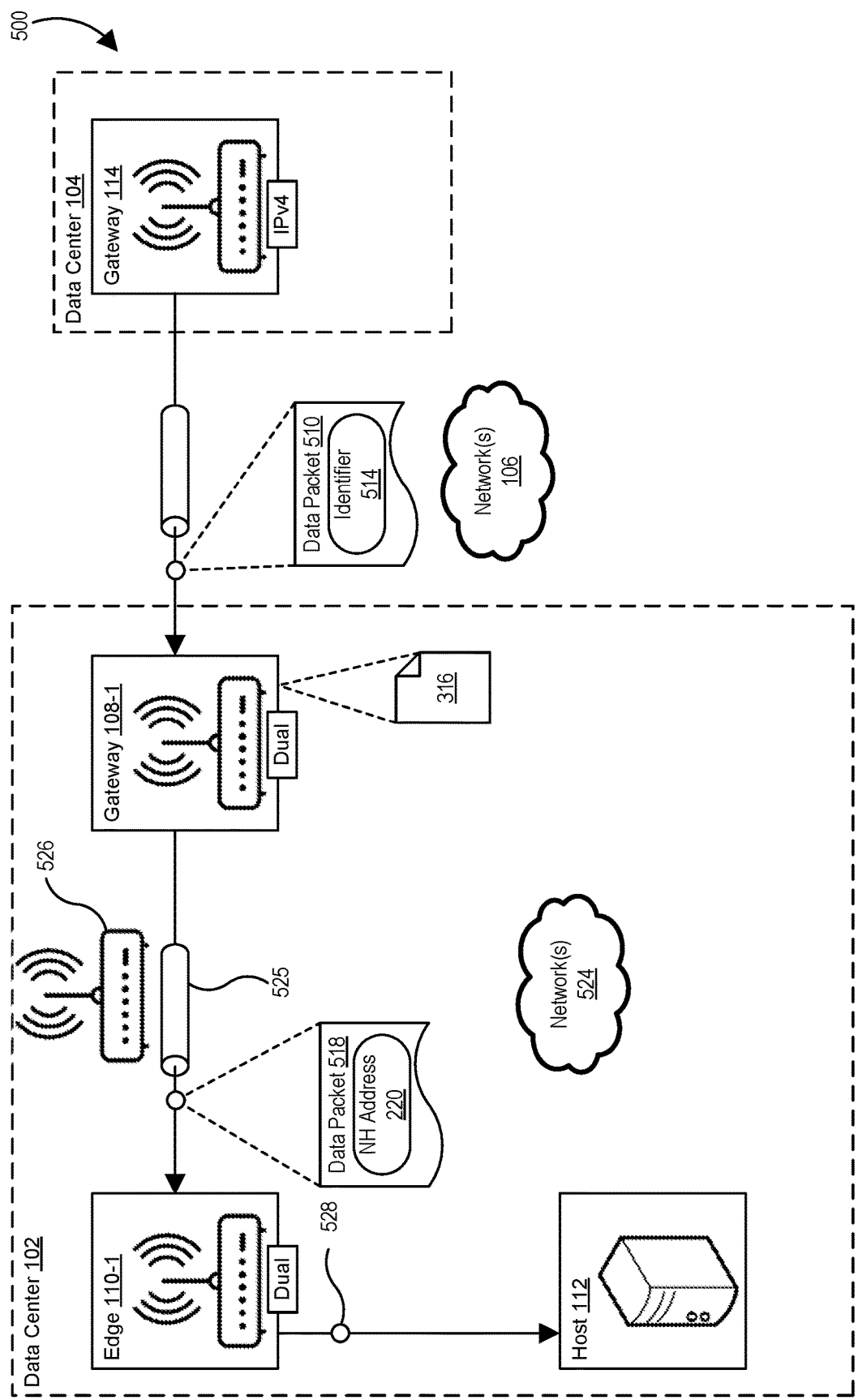
FIG. 5 illustrates an example network environment in which one or more network devices in a data center are in a migration process at a fourth time according to one or more embodiments.

FIG. 5 illustrates an example network environment 500 in which one or more network devices in a data center are in a migration process according to one or more embodiments. The network environment 500 is, more particularly, operating during a fourth time period after the third time period described with respect to FIG. 4. During the fourth time period, gateway device 108-1 receives data packet 428 from gateway device 114 with an overlay according to the first communication protocol, decapsulates the data packet, and re-encapsulates the data packet according to the second communication protocol, as will be further described below.

Various features in the network environment 500 correspond to devices described with respect to FIGS. 1, 2, 3, 4, and elsewhere herein, so further description thereof is omitted for brevity. The network environment 500 includes first data center 102 and second data center 104 communicatively coupled with each other over one or more networks 106.

A gateway device 108-1 in first data center 102 receives data packet 428 over the one or more networks 106 from a gateway device 114 in second data center 104. The data packet 428 has an overlay including an identifier 426 of the gateway device 108-1. The gateway device 108-1, in response to receiving data packet 428, removes the overlay and references a routing table 316 to determine a set of operations to perform on the data packet 428 and how to route a resulting data packet. The gateway device 108-1, more specifically, identifies an entry in the routing table 316 having an address matching the destination address in a header of the data packet 428.

The gateway device 108-1 generates re-encapsulated data packet 518 based on the entry identified in the routing table 316. The re-encapsulated data packet 518 has an overlay including a next-hop address 220 of an edge device 110-1 in first data center 102. The gateway device 108-1 sends the re-encapsulated data packet 518 to the edge device 110-1 via one or more networks 524 internal to first data center 102. As described with respect to FIGS. 1, 2, and elsewhere herein, the gateway device 108-1 and the edge device 110-1 are operating in a dual IP stack mode.

In some embodiments, the gateway device 108-1 may send the re-encapsulated data packet 518 to the edge device 110-1 over a network tunnel 525. The network tunnel 525 may be established and operated according to the second communication protocol. For instance, the network tunnel 525 may be an IPv6 tunnel.

In some embodiments, the gateway device 108-1 is one of a plurality of gateway devices operating in first data center 102. Other gateway devices in first data center 102 may be operating according to a single communication protocol, such as the first communication protocol (e.g., IPv4) or the second communication protocol, or in a dual IP stack mode. In some embodiments, the edge device 110-1 is one of a plurality of edge devices operating in first data center 102. Some devices of the plurality of edge devices may be operating as ingress edge devices whereas other devices of the plurality of edge devices may be operating as egress edge devices. Other edge devices in first data center 102 may be operating according to a single communication protocol, such as the first communication protocol (e.g., IPv4) or the second communication protocol, or in a dual IP stack mode.

In some embodiments, one or more intermediate network devices 526 may convey the re-encapsulated data packet 518 from the gateway device 108-1 to the edge device 110-1 based on the next-hop address 220. Non-limiting examples of the one or more intermediate network devices 526 include network routers or switches operating, for instance, as route reflectors in an MPLS system. In such MPLS systems, the intermediate network devices 526 may perform label switching operations (e.g., PUSH, SWAP, POP) in which labels are included in an underlay layer of the re-encapsulated data packet 518 as it is conveyed through the MPLS system.

The edge device 110-1 receives the re-encapsulated data packet 518 with the next-hop address 220 in an overlay layer. The edge device 110-1 removes (e.g., POPs) the next-hop address 220 in the overlay layer to obtain an unencapsulated data packet 528 that is substantially similar to the data packet 410 sent by the host device 118, as described with respect to FIG. 4. The edge device 110-1 examines the header of the unencapsulated data packet 528 and sends the unencapsulated data packet 528 to a host device 112 based on a match between the destination address in the header and the IP address of the host device 112. The IP address of the host device 112 may be an IPv4 address or an IPv6 address.

Figure 6:
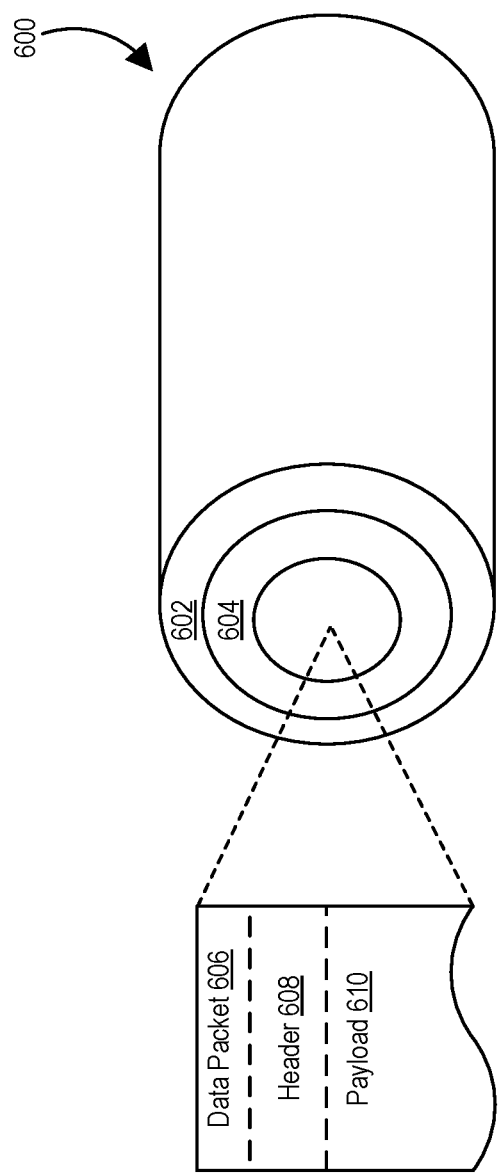
FIG. 6 illustrates an example encapsulated data packet according to one or more embodiments.

FIG. 6 shows an example encapsulated data packet 600 according to one or more embodiments. The encapsulated data packet 600 includes underlay information 602, overlay information 604, and a data packet 606. The underlay information 602 may include information usable by physical network entities or underlay network infrastructure portions to process and route the encapsulated data packet 600. The underlay information 602 may be processed using hard-coded logic of a processing unit in a network device. The overlay information 604, by contrast, may include information usable by virtual network entities or overlay network infrastructure portions to process and route the encapsulated data packet 600. The overlay information 604 may be processed using software or executable instructions stored in memory of a network device. In some implementations, the underlay information 602 may be removed prior to processing the overlay information 604.

The data packet 606 comprises a header 608 including information about the data packet 606, such as a source address, a destination address, packet length, and a communication protocol version of the data packet, by way of non-limiting example. The data packet 606 also comprises a payload 610 constituting the actual data that is to be conveyed from a source to a destination.

Figure 7:
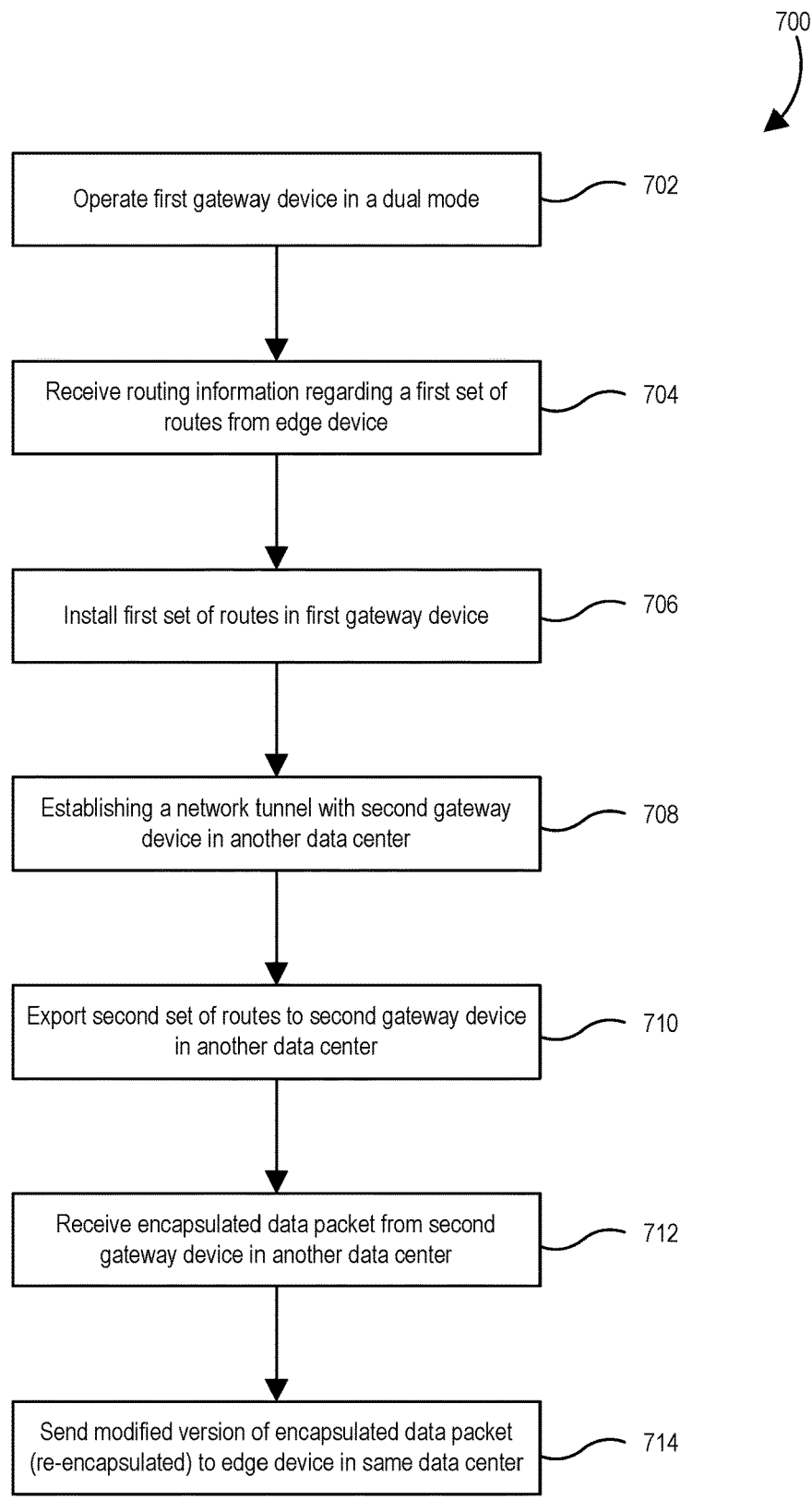
FIG. 7 illustrates a method for hitless migration of a data center from a first communication protocol to a second communication protocol according to one or more embodiments.

FIG. 7 shows a method 700 for hitless migration of a data center from a first communication protocol to a second communication protocol according to one or more embodiments. The method 700 may be performed by any appropriate entity described herein, such as the gateway devices 108. Additionally, the method 700 may be performed by a first gateway device 108 operating in first data center 102 that is transitioning to operate in the second communication protocol from the first communication protocol.

The method 700 includes operating a first gateway device, at step 702, in a dual IP stack mode in which the first gateway device is configured to process network traffic according to a first communication protocol and to process network traffic according to a second communication protocol. In some embodiments, the first communication protocol is IPv4 and the second communication protocol is IPv6. In some implementations, operating in step 702 may include transitioning from a single protocol mode to the dual IP stack mode, the single mode in which the first gateway device is configured to process network traffic according to only one communication protocol of the first and second communication protocols.

The method 700 includes the first gateway device receiving, at step 704, routing information regarding a first set of routes associated with a first host device in first data center 102. The routing information is received from a first edge device operating in first data center. The first edge device, in some embodiments, is also operating in the dual IP stack mode. The first set of routes includes a first address of the first edge device formatted according to the second communication protocol. In some embodiments, the routing information may be received in an advertisement broadcast by the first edge device to other network devices in first data center. The method 700 also includes installing, at step 706, the first set of routes in memory of the first gateway device. For instance, the first gateway device may store the first set of routes in a routing table stored in memory, the routing table usable to route network traffic between network entities.

The method 700 may include establishing, at step 708, a network tunnel from the first gateway device to a second gateway device in second data center. For instance, as described with respect to FIG. 2 and elsewhere herein, a network tunnel may be established between the first gateway device of first data center and second gateway device of second data center. The network tunnel established in step 708 may be established according to a third communication protocol other than the first and second communication protocols. By way of non-limiting example, the network tunnel may be established in step 708 according to VXLAN. In some embodiments, the network tunnel may be established via a BGP EVPN.

The first gateway device performing the method 700 may also determine that the second gateway device is configured to operate in a single protocol mode. In the single protocol mode, the second gateway device is configured to process network traffic according to the first communication protocol but is not configured to process network traffic according to the second communication protocol. The first gateway device may determine that the second gateway device is in the single protocol mode based on an IP address of the second gateway device or based on information received regarding operation of the second gateway device. In some embodiments, determining that the second gateway device is operating in the single protocol mode may be performed as part of or in connection with establishing the network tunnel in step 708. In some embodiments, determining that the second gateway device is operating in the single protocol mode may be based on communications received outside of establishing the network tunnel.

The method 700 further includes the first gateway device exporting, at step 710, a second set of routes to a second gateway device in second data center. The second set of routes are generated based on the first set of routes. For instance, a route in the first set of routes received in step 704 may include an address of the first edge device as a next-hop address, the address formatted according to the second communication protocol. In connection with exporting in step 710, the first gateway device may replace the next-hop address with an identifier of the first edge device. In some embodiments, the identifier may be formatted according to the first communication protocol. In some embodiments, the identifier may be formatted according to a different protocol, such as an MPLS protocol.

The method 700 includes the first gateway device receiving, at step 712, an encapsulated data packet from a second gateway device located in second data center. The encapsulated data packet received in step 712 may have an overlay that includes the identifier of the first gateway device receiving the encapsulated data packet. In some embodiments, the identifier is an address of the first gateway device receiving the encapsulated data packet, the address is formatted according to the first communication protocol. In some embodiments, the identifier is an MPLS label generated by the first gateway device receiving the encapsulated data packet.

At step 714, the method 700 includes the first gateway device sending a modified version of the encapsulated data packet (or re-encapsulating the data packet) to the first edge device. The first gateway device may generate a modified version of the encapsulated packet by at least replacing the identifier in an overlay of the encapsulated data packet with the address of the first edge device as a next-hop address. The modified version of the data packet, or the re-encapsulated data packet, may be sent over a network tunnel established with the first edge device. In some embodiments, the network tunnel may be established and operated according to the second communication protocol (e.g., IPv6).

Figure 8A:
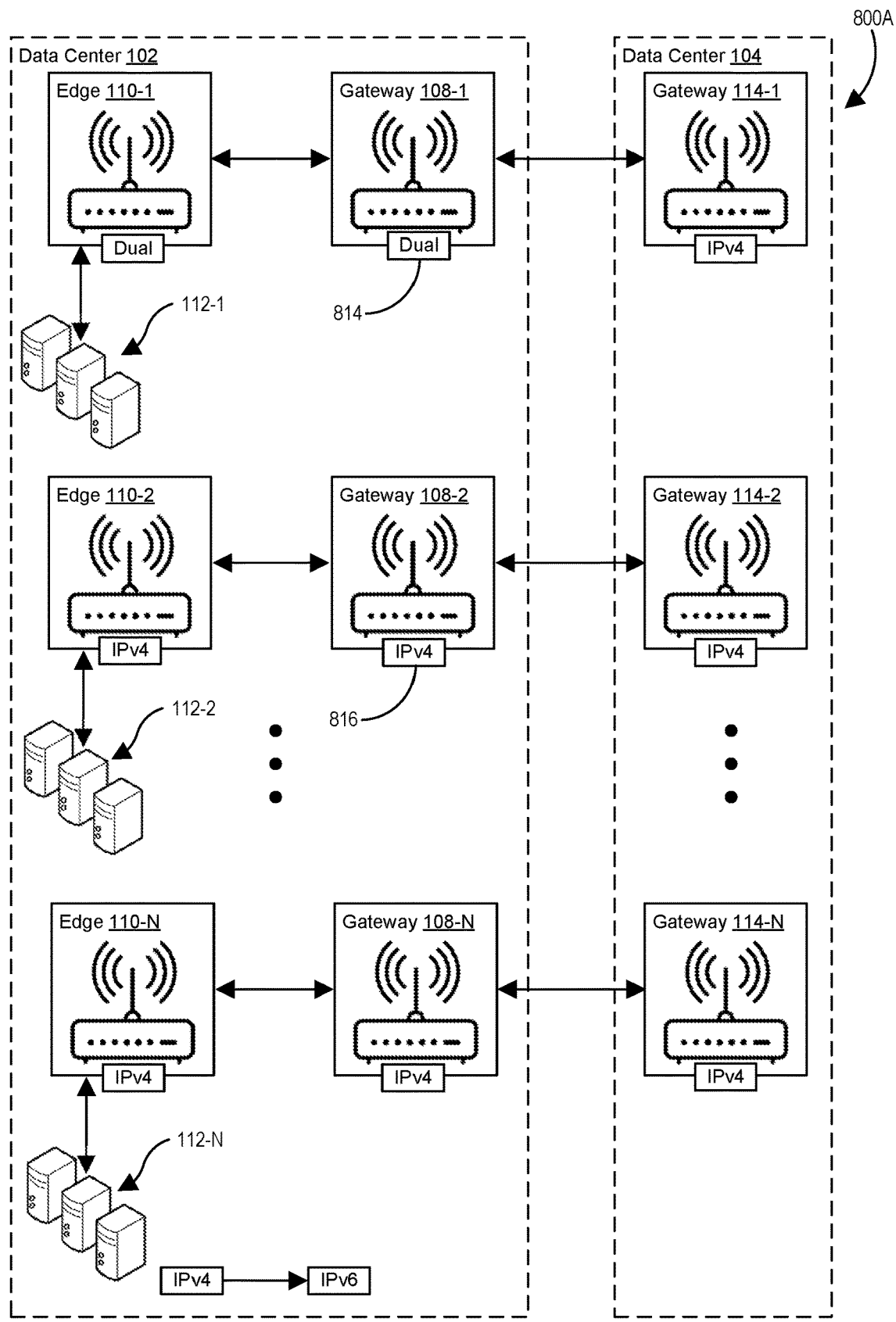
FIG. 8A illustrates a network environment at a first time according to one or more embodiments.

FIG. 8A shows a network environment 800A at a first time according to one or more embodiments. The network environment 800A includes a data center 102 migrating from a first communication protocol to a second communication protocol, as described herein. The network environment 800A also includes a data center 104 operating according to the first communication protocol. Various features described with respect to the network environment 800A are described in greater detail, so further description thereof is omitted.

The data center 102 includes a plurality of gateway devices 108-1, 108-2, . . . 108-N (collectively "gateway devices 108") respectively communicatively coupled with a plurality of edge devices 110-1, 110-2, . . . 110-N (collectively "edge devices 110"). Each of the edge devices 110-1, 110-2, . . . 110-N are communicatively coupled with sets of host devices 112-1, 112-2, . . . 112-N. One or more of the gateway devices 108 may be coupled with a corresponding one of a plurality of gateway devices 114-1, 114-2, . . . 114-N in the data center 104.

In the network environment 800A, the gateway device 108-1 and the edge device 110-1 are operating in a dual IP stack mode 814 in which the devices can process data packets according to the first communication protocol and can process data packets according to the second communication protocol. The remaining gateway devices 108 and edge devices 110 are operating in a single protocol mode 816 in which the devices can process data packets according to the first communication protocol and cannot successfully process data packets according to the second communication protocol. The gateway devices 114 in the data center 104 are also operating in the single protocol mode 816. In some implementations, one or more of the gateway devices 114-2, . . . 114-N may be located in a different data center than the data center 104 or the data center 102.

Figure 8B:
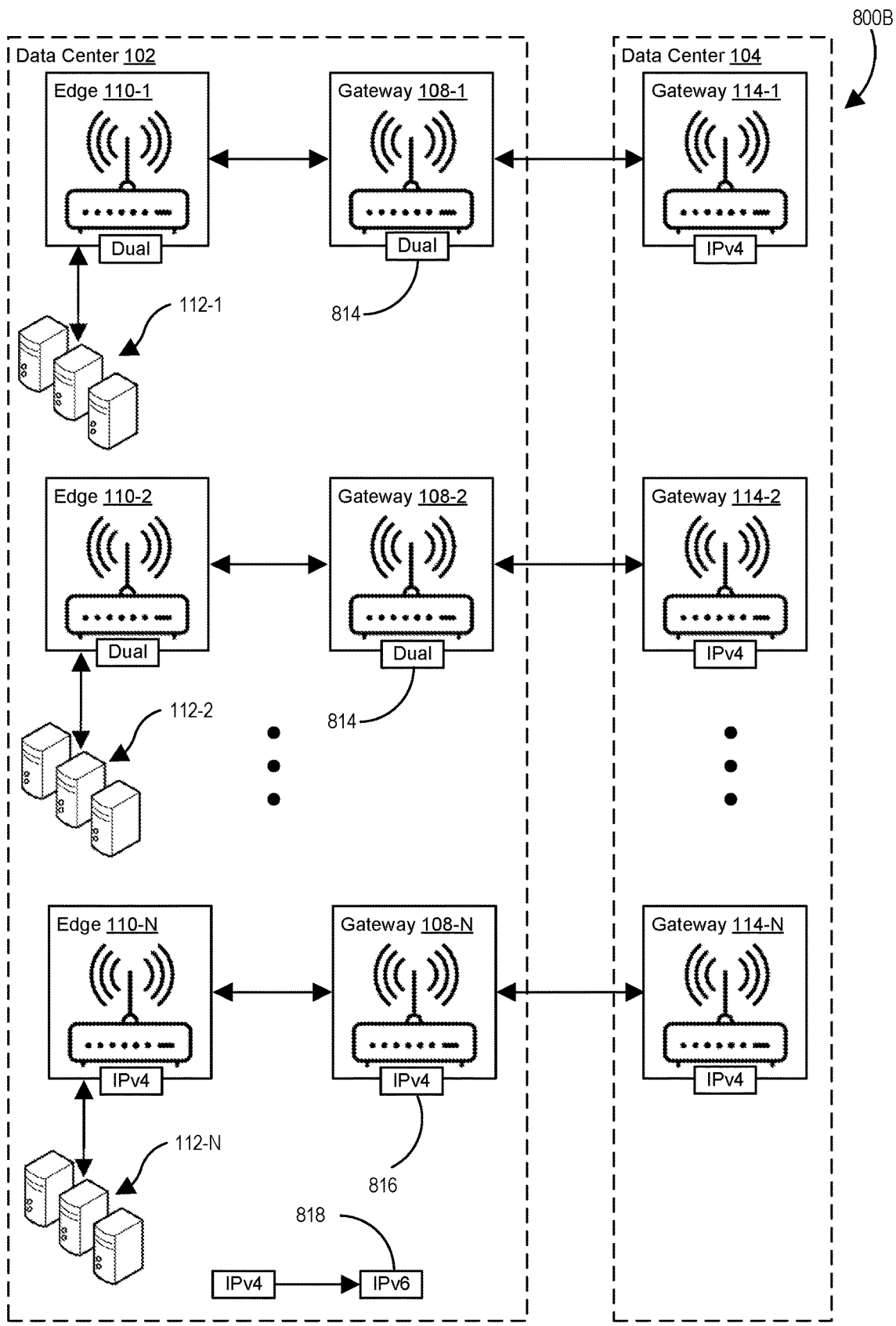
FIG. 8B illustrates a network environment at a second time after the first time according to one or more embodiments.

At the first time shown in FIG. 8A, the set of host devices 112-1 may communicate with host devices in the data center 104 (operating according to the second communication protocol) as described with respect to FIGS. 2 through 7 and elsewhere herein. FIG. 8B shows a network environment 800B at a second time after the first time according to one or more embodiments. At the second time, the gateway device 108-2 and the edge device 110-2 have already transitioned to operate in the dual IP stack mode 814. Thereafter, the set of host devices 112-2 may communicate with the host devices in the data center 104 as described with respect to FIGS. 2 through 7. This process can be repeated until all targeted gateway devices 108 in the data center 102 are transitioned to operate in the dual IP stack mode 814.

The gateway devices 108 of the data center 102 operating in the dual IP stack mode 814 communicate with data centers having gateway devices operating according to the single protocol mode 816 as described with respect to FIGS. 2 through 7. To communicate with data centers having gateway devices operating according to a second communication protocol 818 (e.g., IPv6), the gateway devices 108 of the data center 102 operating in the dual IP stack mode 814 communicate with data centers having gateway devices operating according to the second communication protocol 818. As a result, the data center 102 can be migrated to operate according to the second communication protocol 818 without disruptions or loss of network traffic in an overlay layer.

Figure 9:
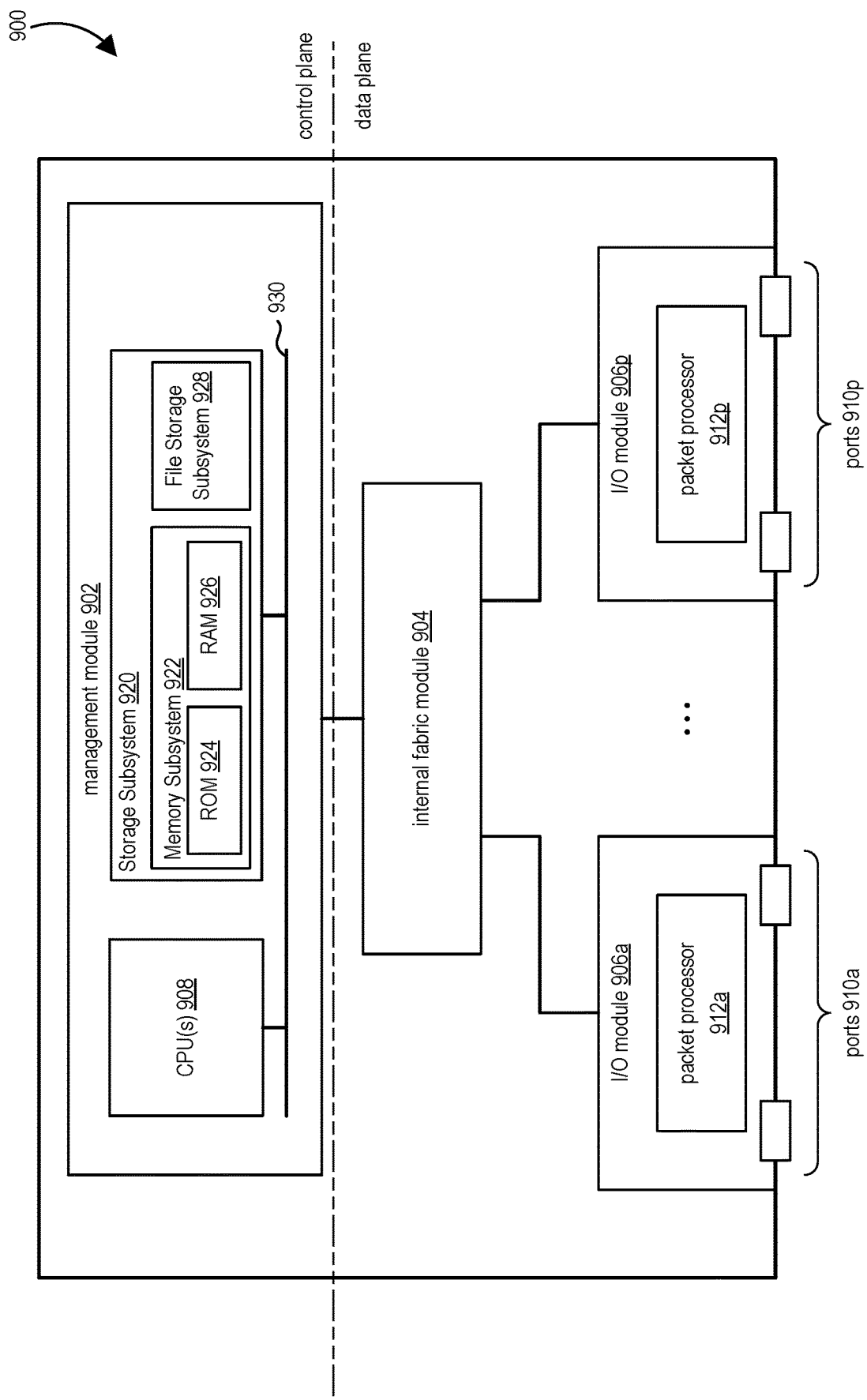
FIG. 9 illustrates a network device that is adapted to operate according to one or more embodiments of the present disclosure.

FIG. 9 illustrates a network device 900 that is adapted to operate according to one or more embodiments of the present disclosure. The network device 900 may be a switch or a router, a gateway device, an edge device, or a host device, for example. As shown, network device 900 can include a management module 902, an internal fabric module 904, and a number of I/O modules 906a-906p. The management module 902 may be located in a control plane (also referred to as control layer) of the network device 900 and can include one or more management CPUs 908 for managing and controlling operation of network device 900 in accordance with the present disclosure. Each management CPU 908 can be a general-purpose processor, such as an Intel®/AMD® x86-64 or ARM® processor, that operates under the control of software stored in memory, such as a storage subsystem 920 and memory subsystem 922, which may include read-only memory 924 and/or random-access memory 926, and/or file storage subsystem 928. In some embodiments, the CPU 908 may include control circuitry, and may include or be coupled to a non-transitory storage medium storing encoded instructions that cause the CPU 908 to perform operations described herein. In some embodiments, the non-transitory storage medium may include encoded logic or hardwired logic for controlling operation of the CPU 908. The control plane refers to all the functions and processes that determine which path to use, such as routing protocols, spanning tree, and the like. Each network device 900 can include multiple elements that may be electrically coupled via a bus 930.

Internal fabric module 904 and I/O modules 906a-906p collectively represent the data plane of network device 900 (also referred to as data layer, forwarding plane, etc.). Internal fabric module 904 is configured to interconnect the various other modules of network device 900. Each I/O module 906a-906p includes one or more input/output ports 910a-910p that are used by network device 900 to send and receive network packets. Each I/O module 906a-906p can also include a packet processor 912a-912p. Each packet processor 912a-912p can comprise a forwarding hardware component configured to make wire speed decisions on how to handle incoming (ingress) and outgoing (egress) network packets. In some embodiments, the forwarding hardware can comprise an application specific integrated circuit (ASIC), a field programmable array (FPGA), a digital processing unit, or other such collection of configured logic.

FURTHER EMBODIMENTS

In some aspects, the techniques described herein relate to a method including: operating, by a first network device in a first data center, in a first mode in which the first network device is configured to process network traffic according to a first communication protocol and to process network traffic according to a second communication protocol; receiving, from a second network device in the first data center while operating in the first mode, first routing information regarding a first set of routes associated with a first host device in the first data center, the first set of routes including a first address of the second network device formatted according to the second communication protocol; installing the first set of routes in a data structure stored in a local memory of the first network device; generating a second set of routes that include a second address of the first network device formatted according to the first communication protocol; exporting the second set of routes to a third network device in a second data center; receiving, from the third network device, an encapsulated data packet having an overlay that includes the second address; de-encapsulating and replacing, in the overlay, the second address with the first address based on the first set of routes stored in the data structure; and sending a re-encapsulated data packet to the second network device.

In some aspects, the techniques described herein relate to a method, wherein generating the second set of routes includes replacing the first address in a route of the first set of routes with the second address.

In some aspects, the techniques described herein relate to a method, wherein the first network device is a first gateway device of the first data center, the second network device is an edge device of the first data center, and the third network device is a second gateway device of the second data center.

In some aspects, the techniques described herein relate to a method, wherein the first communication protocol is Internet Protocol Version 4 (IPv4) and the second communication protocol is Internet Protocol Version 6 (IPv6).

In some aspects, the techniques described herein relate to a method, further including: determining that the third network device is configured to operate in a second mode in which the third network device is configured to process network traffic according to the first communication protocol and is not configured to process network traffic according to the second communication protocol.

In some aspects, the techniques described herein relate to a method, further including: establishing a first network tunnel between the first network device and the third network device, the first network tunnel established according to a Virtual Extensible Local Area Network Protocol, wherein the encapsulated data packet is received over the first network tunnel.

In some aspects, the techniques described herein relate to a method, further including: establishing a second network tunnel according to the first communication protocol between the first network device and the second network device; and establishing a third network tunnel according to the second communication protocol between the first network device and the second network device, wherein the re-encapsulated data packet is sent to the second network device over the third network tunnel.

In some aspects, the techniques described herein relate to a first network device including: one or more processors; one or more network interfaces; and at least one memory storing instructions that, as a result of execution by the one or more processors, cause the first network device to: operate in a first mode in which the first network device is configured to process network traffic according to a first communication protocol and to process network traffic according to a second communication protocol; receive, from a second network device, first routing information regarding a first route associated with a first host device in a first data center, the first route including an address of the second network device formatted according to the second communication protocol; install the first route in a routing table stored in the at least one memory of the first network device; generate a second route that includes an identifier of the first network device formatted according to the first communication protocol; export the second route to a third network device over one or more external networks; receive, from the third network device, an encapsulated data packet having an overlay that includes the identifier; replace, in the overlay, the identifier with the address based on the first route stored in the routing table of the first network device; and send a re-encapsulated data packet to the second network device.

In some aspects, the techniques described herein relate to a first network device, wherein generation of the second route includes replacement of the address in the first route with the identifier.

In some aspects, the techniques described herein relate to a first network device, wherein the first network device is a first gateway device of a first data center, the second network device is an edge device of the first data center, and the third network device is a second gateway device of a second data center.

In some aspects, the techniques described herein relate to a first network device, wherein the first communication protocol is Internet Protocol Version 4 (IPv4) and the second communication protocol is Internet Protocol Version 6 (IPv6).

In some aspects, the techniques described herein relate to a first network device, wherein execution of the instructions cause the first network device to: establish a first network tunnel with the third network device via the one or more external networks; establish a second network tunnel according to the first communication protocol with the second network device; and establish a third network tunnel according to the second communication protocol with the second network device, wherein the re-encapsulated data packet is sent to the third network device over the first network tunnel.

In some aspects, the techniques described herein relate to a first network device, wherein execution of the instructions cause the first network device to: determine, based on information received from the third network device during establishment of the first network tunnel, that the third network device operates in a second mode in which the third network device is configured to process network traffic according to the first communication protocol and is not configured to process network traffic according to the second communication protocol.

In some aspects, the techniques described herein relate to a first network device, wherein the first routing information is received in an advertisement broadcast by the second network device.

In some aspects, the techniques described herein relate to one or more non-transitory computer-readable media storing instructions that, as a result of execution by one or more processors, cause the one or more processors to: enable operation of a first network device in a first data center in a first mode in which the first network device is configured to process network traffic according to a first communication protocol and to process network traffic according to a second communication protocol; receive, from a second network device in the first data center, first routing information regarding a first route associated with a first host device in the first data center; generate, based on the first route, a second route that includes a first address of the first network device formatted according to a first communication protocol; export the second route to a third network device in a second data center; receive, from the third network device, an encapsulated data packet having a first overlay that includes the initial address; and decapsulate and send a re-encapsulated data packet to the second network device, the re-encapsulated data packet having a second overlay that includes a second address, wherein the first address is formatted according to the first communication protocol and the second address is formatted according to a second communication protocol.

In some aspects, the techniques described herein relate to one or more non-transitory computer-readable media, wherein the first communication protocol is Internet Protocol Version 4 (IPv4) and the second communication protocol is Internet Protocol Version 6 (IPv6).

In some aspects, the techniques described herein relate to one or more non-transitory computer-readable media, wherein execution of the instructions causes the one or more processors to: establish a first network tunnel with the third network device according to a third communication protocol, wherein the re-encapsulated data packet is sent to the third network device over the first network tunnel.

In some aspects, the techniques described herein relate to one or more non-transitory computer-readable media, wherein the third communication protocol is a Virtual Extensible Local Area Network Protocol, and wherein the encapsulated data packet is received over the first network tunnel.

In some aspects, the techniques described herein relate to one or more non-transitory computer-readable media, wherein execution of the instructions causes the one or more processors to: install the first route in a routing table stored in a local memory of the first network device; and generate re-encapsulated data packet based on the first route.

In some aspects, the techniques described herein relate to one or more non-transitory computer-readable media, wherein execution of the instructions causes the one or more processors to: establish a second network tunnel with the second network device according to the first communication protocol; and establish a third network tunnel with the second network device according to the second communication protocol, the third network tunnel established in parallel with the second network tunnel.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network. These devices may include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIF S") and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C #or C++, or any scripting language, such as Ruby, PHP, Perl, Python or TCL, as well as combinations thereof. The server(s) may also include database servers, including without limitation those commercially available from Oracle®, Microsoft®, Sybase and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random-access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various features also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members.

Conjunctive language, such as phrases of the form "at least one of A, B, and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

The invention claimed is:

1. A method for migration of at least one device within a data center comprising:
   operating, by a first network device in a first data center, in a first mode in which the first network device is configured to process network traffic according to a first communication protocol and to process network traffic according to a second communication protocol;
   receiving, from a second network device in the first data center while operating in the first mode, first routing information regarding a first set of routes associated with a first host device in the first data center, the first set of routes including a first address of the second network device formatted according to the second communication protocol;
   installing the first set of routes in a data structure stored in a local memory of the first network device;
   generating a second set of routes that include a second address of the first network device formatted according to the first communication protocol;
   exporting the second set of routes to a third network device in a second data center;
   receiving, from the third network device, an encapsulated data packet having an overlay that includes the second address;
   de-encapsulating and replacing, in the overlay, the second address with the first address based on the first set of routes stored in the data structure; and
   sending a re-encapsulated data packet to the second network device.

2. The method of claim 1, wherein generating the second set of routes includes replacing the first address in a route of the first set of routes with the second address.

3. The method of claim 1, wherein the first network device is a first gateway device of the first data center, the second network device is an edge device of the first data center, and the third network device is a second gateway device of the second data center.

4. The method of claim 1, wherein the first communication protocol is Internet Protocol Version 4 (IPv4) and the second communication protocol is Internet Protocol Version 6 (IPv6).

5. The method of claim 1, further comprising:
   determining that the third network device is configured to operate in a second mode in which the third network device is configured to process network traffic according to the first communication protocol and is not configured to process network traffic according to the second communication protocol.

6. The method of claim 1, further comprising:
   establishing a first network tunnel between the first network device and the third network device, the first network tunnel established according to a Virtual Extensible Local Area Network Protocol, wherein the encapsulated data packet is received over the first network tunnel.

7. The method of claim 6, further comprising:
   establishing a second network tunnel according to the first communication protocol between the first network device and the second network device; and
   establishing a third network tunnel according to the second communication protocol between the first network device and the second network device, wherein the re-encapsulated data packet is sent to the second network device over the third network tunnel.

8. A first network device comprising:
   one or more processors;
   one or more network interfaces; and
   at least one memory storing instructions that, as a result of execution by the one or more processors, cause the first network device to:
      operate in a first mode in which the first network device is configured to process network traffic according to a first communication protocol and to process network traffic according to a second communication protocol;
      receive, from a second network device, first routing information regarding a first route associated with a first host device in a first data center, the first route including an address of the second network device formatted according to the second communication protocol;
      install the first route in a routing table stored in the at least one memory of the first network device;
      generate a second route that includes an identifier of the first network device formatted according to the first communication protocol;
      export the second route to a third network device over one or more external networks;
      receive, from the third network device, an encapsulated data packet having an overlay that includes the identifier;
      replace, in the overlay, the identifier with the address based on the first route stored in the routing table of the first network device; and
      send a re-encapsulated data packet to the second network device.

9. The first network device of claim 8, wherein generation of the second route includes replacement of the address in the first route with the identifier.

10. The first network device of claim 8, wherein the first network device is a first gateway device of a first data center, the second network device is an edge device of the first data center, and the third network device is a second gateway device of a second data center.

11. The first network device of claim 8, wherein the first communication protocol is Internet Protocol Version 4 (IPv4) and the second communication protocol is Internet Protocol Version 6 (IPv6).

12. The first network device of claim 8, wherein execution of the instructions cause the first network device to:
   establish a first network tunnel with the third network device via the one or more external networks;
   establish a second network tunnel according to the first communication protocol with the second network device; and
   establish a third network tunnel according to the second communication protocol with the second network device, wherein the re-encapsulated data packet is sent to the third network device over the first network tunnel.

13. The first network device of claim 12, wherein execution of the instructions cause the first network device to:
   determine, based on information received from the third network device during establishment of the first network tunnel, that the third network device operates in a second mode in which the third network device is configured to process network traffic according to the first communication protocol and is not configured to process network traffic according to the second communication protocol.

14. The first network device of claim 8, wherein the first routing information is received in an advertisement broadcast by the second network device.

15. One or more non-transitory computer-readable media storing instructions that, as a result of execution by one or more processors, cause the one or more processors to:
   enable operation of a first network device in a first data center in a first mode in which the first network device is configured to process network traffic according to a first communication protocol and to process network traffic according to a second communication protocol;
   receive, from a second network device in the first data center, first routing information regarding a first route associated with a first host device in the first data center;
   generate, based on the first route, a second route that includes a first address of the first network device formatted according to a first communication protocol;
   export the second route to a third network device in a second data center;
   receive, from the third network device, an encapsulated data packet having a first overlay that includes the initial address; and
   decapsulate and send a re-encapsulated data packet to the second network device, the re-encapsulated data packet having a second overlay that includes a second address, wherein the first address is formatted according to the first communication protocol and the second address is formatted according to a second communication protocol.

16. The one or more non-transitory computer-readable media of claim 15, wherein the first communication protocol is Internet Protocol Version 4 (IPv4) and the second communication protocol is Internet Protocol Version 6 (IPv6).

17. The one or more non-transitory computer-readable media of claim 15, wherein execution of the instructions causes the one or more processors to:
   establish a first network tunnel with the third network device according to a third communication protocol, wherein the re-encapsulated data packet is sent to the third network device over the first network tunnel.

18. The one or more non-transitory computer-readable media of claim 17, wherein the third communication protocol is a Virtual Extensible Local Area Network Protocol, and wherein the encapsulated data packet is received over the first network tunnel.

19. The one or more non-transitory computer-readable media of claim 15, wherein execution of the instructions causes the one or more processors to:
   install the first route in a routing table stored in a local memory of the first network device; and
   generate re-encapsulated data packet based on the first route.

20. The one or more non-transitory computer-readable media of claim 15, wherein execution of the instructions causes the one or more processors to:
   establish a second network tunnel with the second network device according to the first communication protocol; and
   establish a third network tunnel with the second network device according to the second communication protocol, the third network tunnel established in parallel with the second network tunnel.

* * * * *